United States Patent [19]
Ramanathan et al.

[11] Patent Number: 6,011,552
[45] Date of Patent: Jan. 4, 2000

[54] RELOCATABLE MENU ICON FOR ACCESSING AN APPLICATION IN A GRAPHICAL USER INTERFACE

[75] Inventors: Ramanathan Ramanathan; Peter S. Adamson, both of Portland, Oreg.

[73] Assignee: Intel Corporation, Santa Clara, Calif.

[21] Appl. No.: 09/007,450

[22] Filed: Jan. 15, 1998

Related U.S. Application Data

[63] Continuation of application No. 08/673,688, Jun. 24, 1996.

[51] Int. Cl.$^7$ ...................................................... G06F 3/00
[52] U.S. Cl. ............................................................. 345/345
[58] Field of Search .................................... 345/340, 343, 345/345, 346

[56] References Cited

FOREIGN PATENT DOCUMENTS 409171451 of 1995 Japan .

OTHER PUBLICATIONS

Simon, B., "Win EZ Pro," *PC Magazine*, VII, R16, p. 168(1), 1992.

Primary Examiner—A. Katbab
Attorney, Agent, or Firm—Blakely, Sokoloff, Taylor & Zafman LLP

[57] ABSTRACT

A computer-implemented method of providing access to a first application in a graphical user interface is described. For a first window having the current focus, a determination is made as to whether the first window is associated with the first application. A menu icon is placed within a title bar of the first window if the first application is not associated with the first window. A menu associated with the first application is provided if the menu icon is selected. A method of proportionate placement of the menu icon when resizing or switching between windows is also described. A computer implemented method of repositioning a menu icon is provided to maintain proportional location of the menu icon when switching from a first application window to a second application window or when forming a second application window by resizing the first application window. A new location, d, for the menu icon is computed from $d=l*D/L$ wherein l represents the length of the second application window title bar, L represents the length of the first application window title bar, and D represents the distance from the menu icon to an end of the first application window title bar. The menu icon is then located at the distance, d, from a corresponding end of the second application window title bar. These methods help ensure ready access to an application in a graphical user interface regardless of focus changes, window position, window movement, or window resizing.

23 Claims, 8 Drawing Sheets

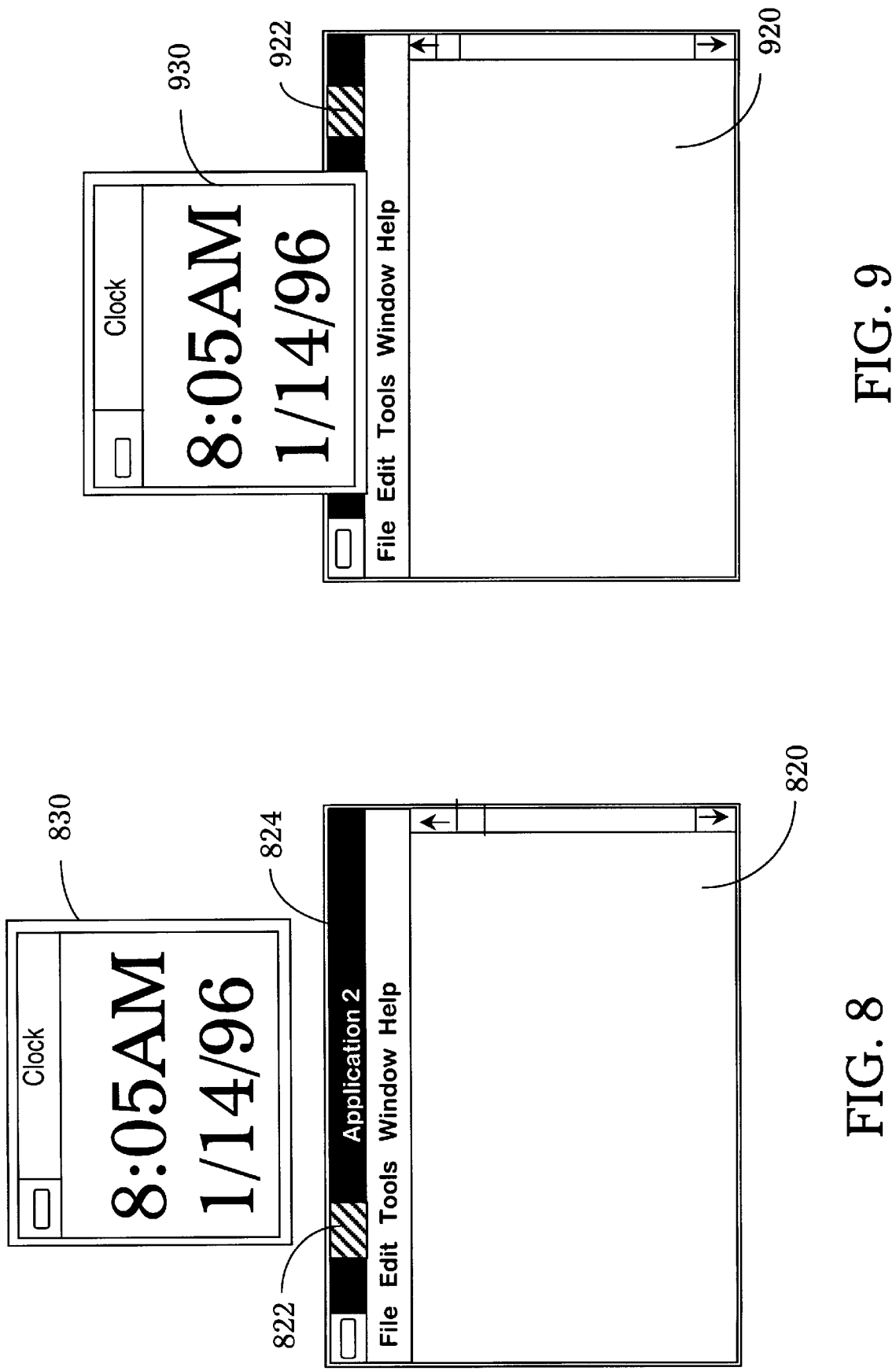

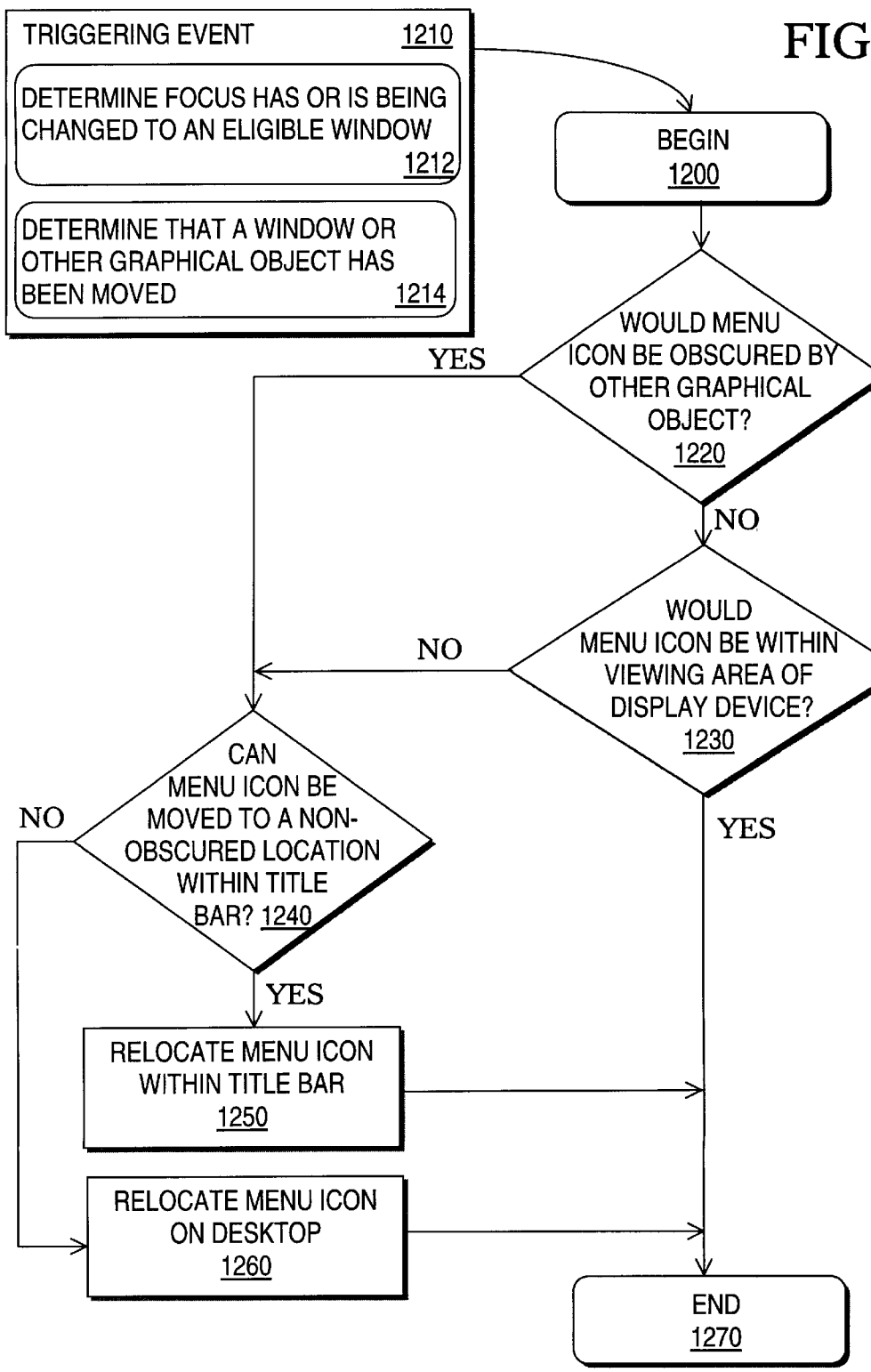

RELOCATABLE MENU ICON FOR ACCESSING AN APPLICATION IN A GRAPHICAL USER INTERFACE

This application is a continuation of application Ser. No. 08,673,688, filed on on Jun. 24, 1996.

FIELD OF THE INVENTION

The present invention relates to the field of graphical user interfaces. In particular, the present invention relates to a computer implemented method for providing access to an application without changing the application window having the current focus.

BACKGROUND OF THE INVENTION

The advent of graphical user interfaces (GUIs) has enhanced the use and functionality of computers. For example, if an operating system permits multiple applications to run "simultaneously", each application is typically associated with one or more graphical windows which appear on a computer display screen. "Simultaneously" is intended to mean from a user's viewpoint and not necessarily actually concurrently executing applications. The user may have the ability to switch between different applications executing on a computer by selecting and manipulating icons and windows which appear on the computer display. For example, a word processing application might be accessible through one window appearing on the display. A spreadsheet application might be accessible through another window appearing on the display. Alternatively a single application may have a number of windows displayed at any given time.

The windows associated with the applications are referred to as application windows. The windows could be arranged in any number of ways on the computer display. For example, these windows might (1) take up an entire display screen, (2) appear to be tiled such that they do not overlap, or (3) they might overlap. Examples of operating systems incorporating GUI functionality include the Microsoft Windows™, Windows 95, and Windows NT operating systems (Microsoft Corporation of Redmond, Wash.), the Apple Operating System (Apple Computer of Cupertino, Calif.), and IBM's OS/2™ (IBM Corporation of Armonk, N.Y.).

One disadvantage of some graphical user interfaces is that the user must typically "switch back" to an application in order to set selectable parameters for that application. This switching back and forth can be undesirable.

Consider a video conferencing application such as ProShare™ manufactured by Intel Corporation of Santa Clara, Calif. ProShare™ is a video conferencing system that permits participants to communicate graphical (e.g., video) information with each other. ProShare™ permits users to share information (including images and documents) on their respective displays with each other. This is particularly useful for concurrently viewing and editing documents. In order to share, however, the ProShare™ user must "switch back" to the ProShare™ application window to initiate the sharing operation. Then the user must "switch back" to an application window or document window in order to identify the application or document to ProShare™ so that it can be shared.

The "switching" process is often referred to as "changing the focus." Thus in order to switch back to the ProShare™ application, the user would need to change the focus to the ProShare™ application window.

One disadvantage of the "switching" process is that it introduces a number of steps which tend to reduce the intuitiveness of the sharing operation. In order to change the focus to the ProShare™ application window, the user must first locate the ProShare™ application window. The user may need to search among a number of windows being displayed on the display device to locate the ProShare™ application window. Once the ProShare™ application window is found, the user would select the sharing option to indicate that some document or application is to be shared with teleconference participants. After the sharing option is selected, the user would indicate the document or application to be shared by selecting the window to be shared. As stated above, this may require searching among a number of windows being displayed at the same time on the display device. If more than a few windows are displayed at the same time, the user may find difficulty in locating the ProShare™ application and then the document or application to be shared.

Another disadvantage is that the switching back and forth process may also prove annoying to participants in the video conferencing session.

A method for providing access to a first application in a graphical user interface without changing the focus from an application window that is not associated with the first application is desirable.

SUMMARY OF THE INVENTION

In accordance with one aspect of the invention, a computer is programmed to implement a method for providing access to a first application in a graphical user interface. For a first window having the current focus, a determination is made whether the first window is associated with a first application. A menu icon is placed within a title bar of the first window if the first application is not associated with the first window. A menu associated with the first application is provided if the menu icon is selected. The menu includes menu items associated with the first application so that a user may access the first application.

A computer implemented method of repositioning a menu icon located in a title bar of a first window is also provided. A determination is made whether a second window will obscure at least a portion of the first window. If so, a determination is made as to whether the second window is within a distance, l, from the menu icon. If necessary, the menu icon is repositioned to a new location within the title bar of the first window so that the menu icon is not within a distance, l, of the second window.

A computer implemented method of repositioning a menu icon is provided to maintain proportional location of the menu icon when switching from a first application window to a second application window. A new location, d, for the menu icon is computed from $d = l*D/L$ wherein l represents the length of the second application window title bar, L represents the length of the first application window title bar, and D represents the distance from the menu icon to an end of the first application window title bar. The menu icon is then located at the distance, d, from the corresponding end of the second application window title bar.

A computer implemented method of repositioning the menu icon located in the title bar of a first window is provided to help prevent the menu icon from being obscured by an edge of the display device. If at least a portion of the first window is displayed on the display device, a determination is made whether an edge of the display device is within a distance, l, of the menu icon. If so, the menu icon is repositioned to a new location within the title bar of the first window. The new location is within the viewing area of the display device but not within the distance, l, of the edge of the display device.

These methods help to ensure ready access to an application in a graphical user interface through 1) either the application itself, or 2) a readily accessible relocatable icon in the title bar of a window having the current focus regardless of whether the window is moved or resized.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 8 illustrates location of the menu icon before encountering an "always-on-top" type of window.

FIG. 9 illustrates relocation of the menu icon upon encountering an always-on-top type of window.

FIG. 12 illustrates a flowchart for relocating the menu icon in response to a triggering event.

DETAILED DESCRIPTION

Graphical user interfaces tend to have some features or elements in common. Application windows generally include title bars, menu bars, window control boxes, scroll bars, and borders. These application windows may typically be moved around an area referred to as the desktop. The menu bar or main menu includes a list of menu items. When one of the menu items is selected either a command will be executed or an individual menu with additional menu items will appear. There are many styles of menus which could appear depending upon the application and the user's preferences. A non-exclusive list of menu styles includes pull-down menus, pop-up menus, and tear-away menus.

Figure 1:
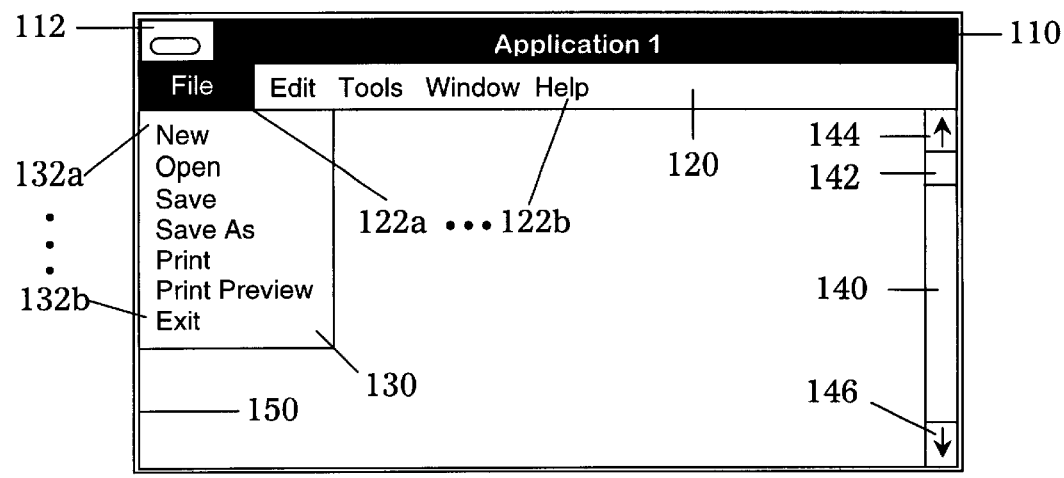
FIG. 1 is an illustration of a generic graphical user interface including elements of a typical window.

FIG. 1 illustrates a number of these graphical user interface elements for window 100. The boundaries of the window are indicated by border 150. Title bar 110 typically appears at the top of the window to inform the user of the application associated with the window. Window control 112 is used for moving, closing, or re-sizing the window. Window control 112 may be referred to as the system icon in another graphical user interface (e.g., Microsoft Windows 95). Main menu 120 usually appears across the top of the application window. The window may include a scroll bar such as vertical scroll bar 140. The scroll bar includes controls for incrementally scrolling up or down (144, 146). In addition, scroll bar 140 includes slide 142 for scrolling rapidly through the subject matter of window 100.

FIG. 1 is intended to illustrate a generic window in a graphical user interface. Specific graphical user interfaces tend to use some variation of the elements of FIG. 1.

A user can typically interact with a graphical window such as an application window by using a pointing device and/or a keyboard. Pointing devices include cursor control devices such as a mouse, a touch pad, a stylus, or the keyboard. A window can be manipulated (e.g., opened, closed, moved) by sending the window an "event" and manipulating the cursor control device. Typically the "event" comprises clicking or double-clicking a mouse button in a particular area near or within the boundaries of the window. However, an event can often also be signaled by a certain sequence of keystrokes on the keyboard. Generally user input such as keyboard input will be directed by the operating system to an active application window referred to as the window having the current "focus."

Although a number of windows may be concurrently displayed, typically only one window may have the current focus. In order to access the menu bar in a window associated with a particular application, that window must have the current focus. Thus the user would need to change the focus to that window to permit selecting an item from that window's menu bar. Changing the focus is typically accomplished through the use of a pointing device or a keyboard.

Rather than changing the focus, a menu icon associated with a first application is provided in the title bar of the window that has the current focus if that window is not associated with the first application. An icon is a graphics image used to represent an object that can be manipulated or accessed by the user. Icons are visual mnemonics that permit the user to control computer actions using images instead of, for example, typing commands from the keyboard.

Figure 2:
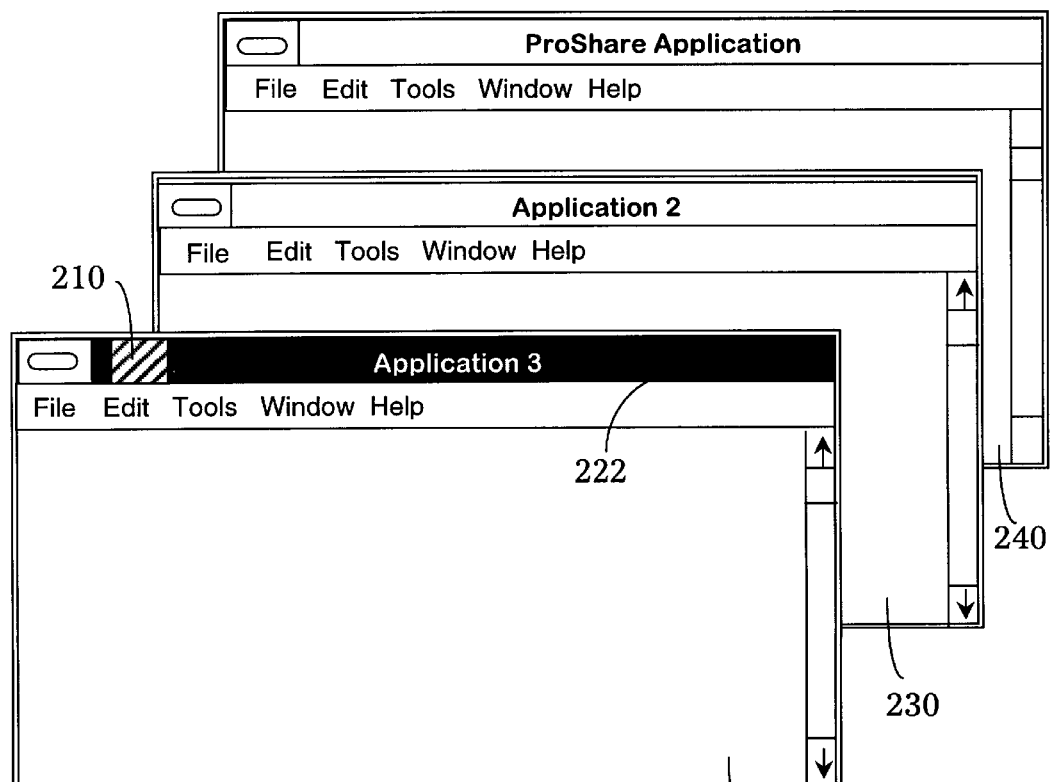
FIG. 2 illustrates a menu icon located in the title bar of an application window having the current focus.

FIG. 2 illustrates menu icon 210 located in title bar 222 of application window 220. Application window 220 currently has the focus. The menu icon 210 is not located in the title bars of application windows 230 and 240.

The image portrayed by menu icon 210 should be chosen so that the menu icon is readily distinguishable from the remainder of the title bar. In one embodiment, the graphic image chosen for the menu icon is the same as an icon associated with the first application. For example, the graphic image chosen for the menu icon might indicate that the menu icon is associated with the ProShare™ application.

In one embodiment, the menu icon is movable so that the menu icon can be moved within a title bar. This might be accomplished using a pointing device or the keyboard.

Figure 3:
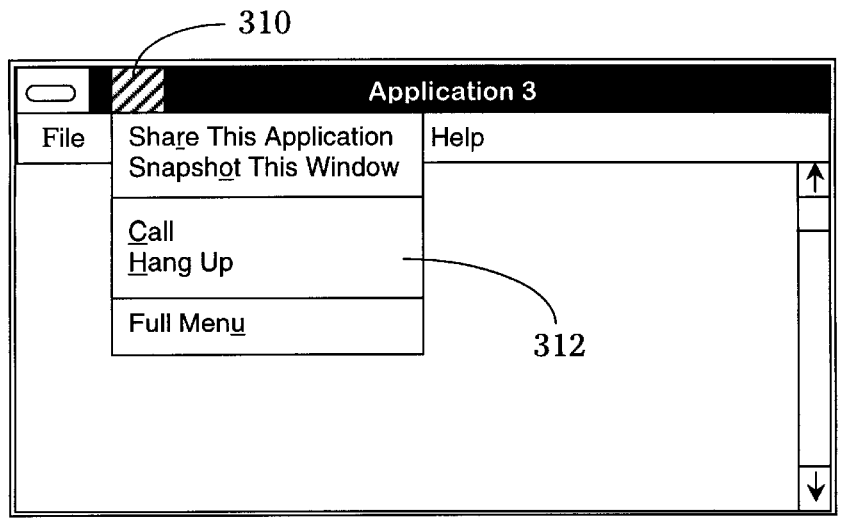
FIG. 3 illustrates a menu associated with the menu icon.

Referring to FIG. 3, when menu icon 310 is selected, a menu 312 associated with the first application appears. Menu 312 provides a number of menu items that can be selected without having to first change the focus back to the first application (e.g., ProShare™). Selection of the menu icon might be accomplished with a pointing device or the keyboard as described above. Permitting the user to select menu items associated with the first application using this technique saves several steps.

For example, consider application sharing using a teleconferencing application such as ProShare™. Although ProShare™ permits users to "share" applications such that a user in one location can see and interact with an application belonging to another user in another location, the application or document to be shared must first be identified to ProShare™ as an application that should be shared. In other words, ProShare™ must be informed of the applications that are to be shared. The menu icon provides a readily accessible method of accessing the "sharing" option (see menu 312). Furthermore, graphical user interfaces tend to use sophisticated messaging systems for communication such that context information can be provided by the system instead of directly by the user.

For example, assume a word processing application currently has the focus and the menu icon appears in the title bar of the word processing application. When "sharing" is selected from the menu icon's menu, the graphical user interface is able to provide context information to inform ProShare™ that the "sharing" option from the menu icon's menu was selected from the title bar of the word processing application (i.e., the word processing application has the current focus. ProShare™ can use this context information to automatically share the word processing application without having to be explicitly instructed by the user to share the word processing application.

This helps to improve the intuitiveness of selecting operations from the ProShare™ application. First the user is aware that ProShare™ is active from the appearance of the menu icon. The fact that the ProShare™ application is active may not be readily apparent if a conference is not in progress. Second, the ready accessibility of the menu icon and its associated menu reduces the steps that the user otherwise needs to perform in order to accomplish the selectable menu items. The reduction in the number of steps tends to improve the ease-of-use for the user. In other words, the user can reduce the steps needed to perform operations such as sharing, initiating a call, or terminating a call depending upon the options provided within the menu.

Although the example application is a teleconferencing application, the menu icon can be provided for other applications to increase the intuitiveness and ease of use of those applications as well.

In one embodiment, the menu icon is not necessary when an application window of the application associated with the menu icon has the focus. Therefore the menu icon does not appear in the title bar of an application window associated with the same application. This is illustrated by comparing FIGS. 2 and 4.

In FIG. 2, menu icon 210 does not appear in the title bar of its associated application window 240 nor does menu icon 210 appear in any application window other than the application window having the current focus. Thus when multiple windows appear on the display, the menu icon only appears in the title bar of the window with the current focus, if at all. Assuming that the menu icon 210 is associated with a first application, the menu icon 210 should appear in the title bar of any window not associated with the first application as long as the title bar is part of a window that currently has the focus. Thus menu icon 210 does not appear in the title bar of application window 240 regardless of whether application window 240 has the current focus or not. This will be further illustrated in FIG. 4.

In one embodiment, application window 220 is referred to as an "eligible window." In one embodiment, only application windows that are not otherwise associated with the same application as the menu icon are within the class of eligible windows. Thus application window 240 is not an eligible window. This is further illustrated in FIG. 4.

Figure 4:
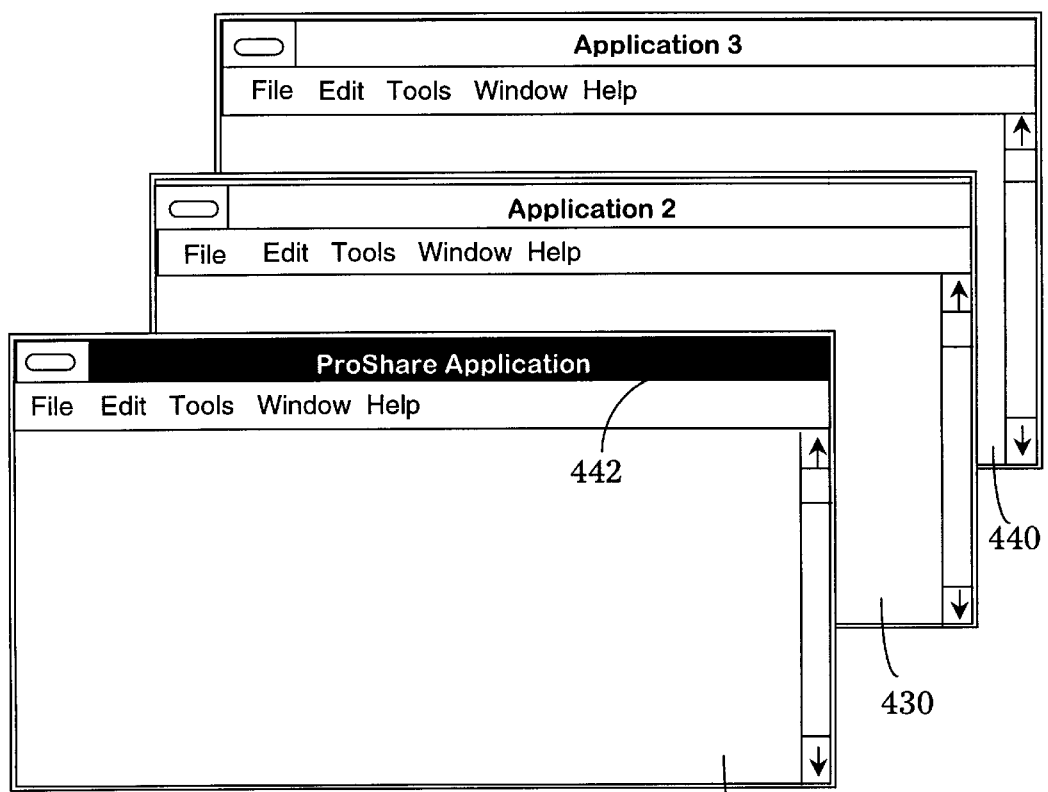
FIG. 4 illustrates a display with multiple windows wherein an application window associated with the menu icon has the current focus.

In FIG. 4, although application window 440 has the current focus, no menu icon is present. This is because the menu icon is associated with the same application as the application window that currently has the focus. Thus application window 440 is not an eligible window.

One type of window that utilized in a graphical user interface is referred to as a "dialog box." A dialog box is generally used to present alternative courses of action, request additional information, or warn the user of a system condition such as an error. A dialog box is typically associated with a parent window. The parent window might be another dialog box or an application window. The dialog box is always subordinate to the parent window. Thus, for example, if the parent window is closed, the dialog box or boxes associated with that parent window will be closed. In some cases the dialog box is modal, i.e., the dialog box does not permit interaction with other windows until it is responded to. In other cases, the dialog box is modeless and permits interaction with other windows. In one embodiment, dialog boxes are excluded from the class of eligible windows.

Typically, although an application may have a number of windows associated with it that are simultaneously displayed, only one of those windows is a "parent" window. The other windows are typically referred to as "child" windows. The child windows are subordinate to the parent window. Furthermore, there may be multiple levels of "children" such that a child of one window is a parent to another window. Typically, however, there is one parent window that is the "topmost" window. "Topmost" is intended to indicate topmost from a control hierarchy viewpoint rather than topmost in terms of placement or appearance on the display device. For example, controls which close the parent or topmost window will close all of the subordinate associated child windows as well.

Consider a word processing application with a number of open documents, each document appearing in a separate window. The word processor application window is the parent. Each of the document windows is a child of that parent. Thus when the parent window is closed (e.g., execution of the word processing application is terminated) all of the document windows will likewise be closed.

In one embodiment only parent windows are eligible windows. In another embodiment only the topmost parent windows are eligible windows.

A computer implemented method of providing access to a first application in a graphical user interface is thus provided. For a first window that has the focus, a determination of whether the first window is associated with the first application must be made. If the first window is not associated with the first application, then a menu icon is provided in the title bar of the first window. If the menu icon is selected then a menu associated with the first application is provided.

Although switching back and forth between the first application window and other application windows may be undesirable, switching between application windows that are not associated with the first application may be necessary. Thus the menu icon should move accordingly.

In particular, when changing the current focus from a first application window to an eligible second application window, the menu icon should automatically be relocated to the title bar of that eligible second application window. Thus when changing the focus to a second window that is not associated with the first application, the menu icon is removed from the title bar of the application window that previously had the focus and is relocated to the title bar of an eligible application window that currently has the focus.

In one embodiment, the proportionate position of the menu icon is maintained when switching between windows. In other words, the position of the menu icon within the title bar of a first application window is proportionately maintained when the menu icon is relocated to the title bar of a second application window. Thus if the first and second application windows have substantially the same length of title bars, the menu icon will appear to be in approximately the same location within the title bar of either application window. If, however, the title bars are different lengths, then the location of the menu icon within the title bar of the second application window is scaled accordingly.

Figure 5:
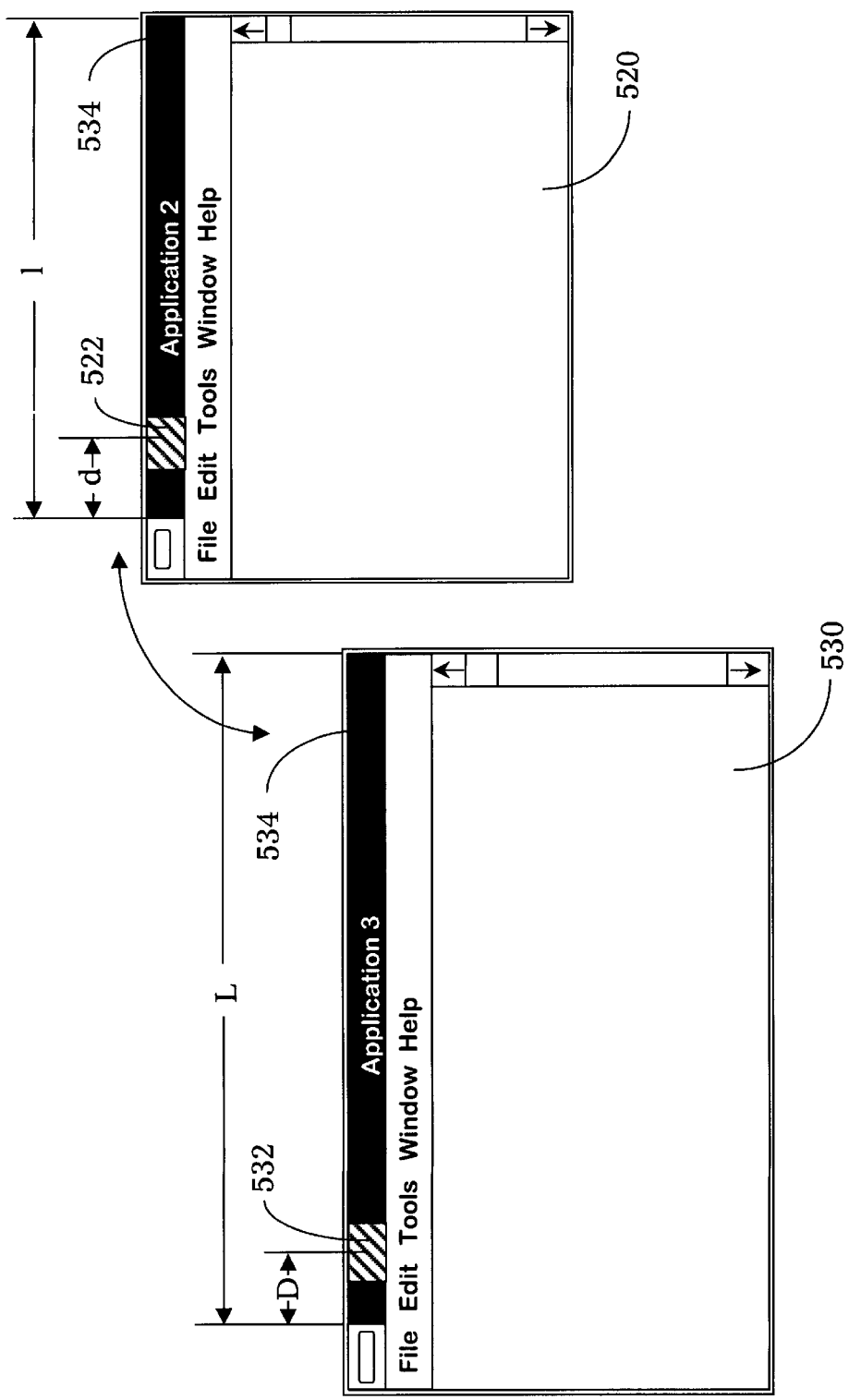
FIG. 5 illustrates placement of the menu icon when switching between application windows of different dimensions.

FIG. 5 illustrates switching the focus between a first application window (530) and a second application window (520). In one embodiment, the proportionate location is determined from the relative position of the menu icon and the length of the title bar.

Figure 6:
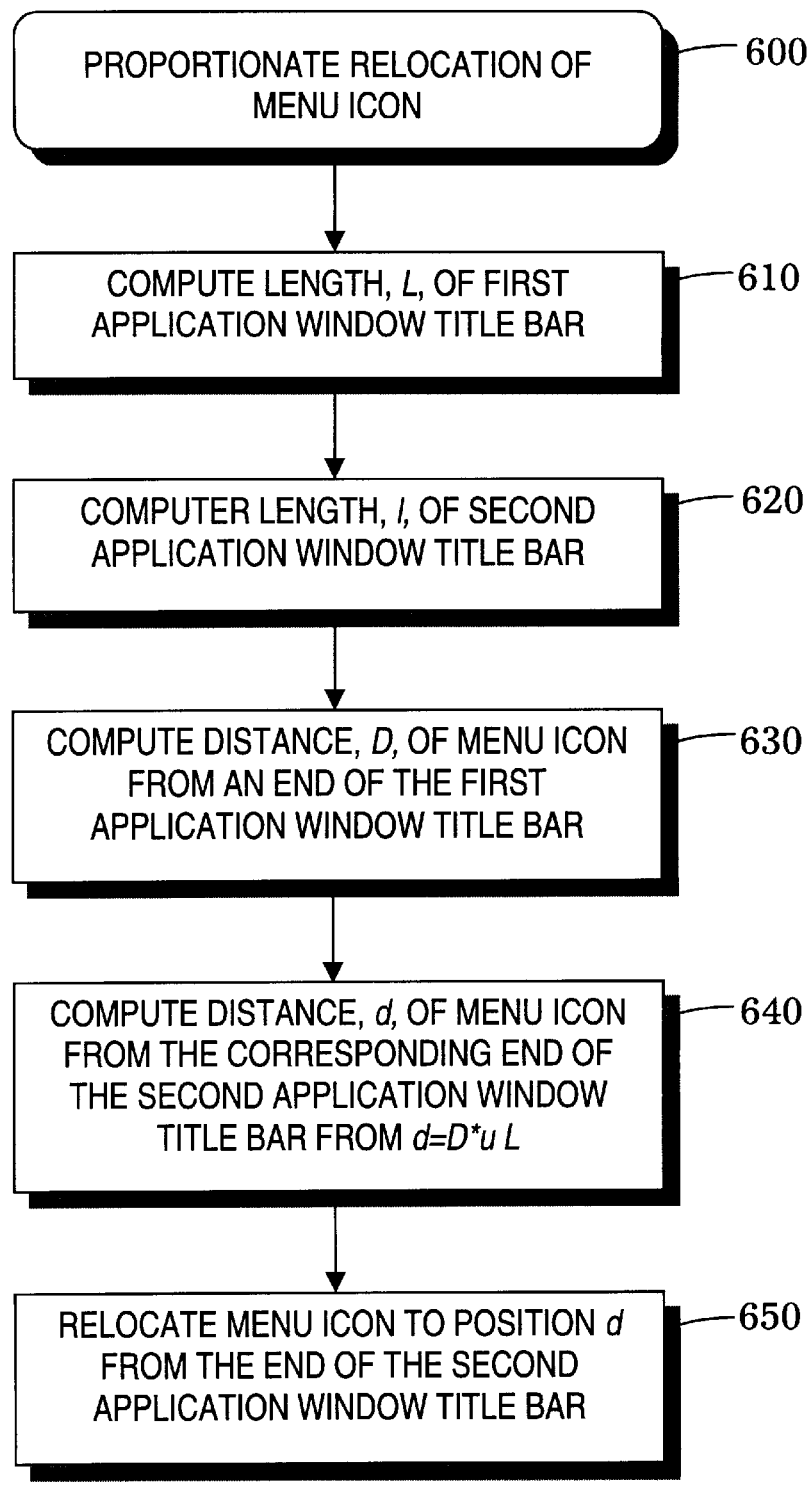
FIG. 6 illustrates a flowchart for locating the menu icon when switching the focus between a first and second application window.

FIG. 6 illustrates a flowchart for one embodiment of the computer implemented method for the proportionate relocation of the menu icon (600). Referring to FIGS. 5 and 6, a length, L, of the first application window title bar (534) is computed in step 610. A length, l, of the second application window title bar (524) is computed in step 620. In step 630, a distance, D, of the menu icon 532 from an end of the first application window title bar is computed. A distance, d, of the menu icon 522 from the corresponding end of the second application window title bar is computed as d=D*l/L in step 640. The menu icon is then relocated to the distance, d, from the corresponding end of the second application window title bar in step 650. Thus the position of the menu icon within the title bar can be proportionately maintained when switching between application windows.

A number of variations may be made in the calculation of d, D, l, and L. For example, Z and L might include the borders such that the length of the title bar is equivalent to the width of the window (for a horizontal title bar). Similarly, d and D might include the border around the application window such that the position of the menu icon is measured from an outside edge of the application window. In one embodiment d and D are measured to the edge of the menu icon. In another embodiment, d and D are measured to the center of the menu icon.

Although the title bar is typically located near the top and between the left and right sides of the window, other graphical user interfaces might position the title bar in another manner. For example, the title bar may be positioned at the bottom of the window (i.e., a caption bar). Alternatively, the title bar may be rotated so that it extends from the top to the bottom of a window along the right or left side of the window. Because of these possibilities the dimension of "length" is used instead of "height" or "width" in the examples presented above. Similarly, the term "end" has been used rather than "side." Thus the method set forth in FIG. 6 is applicable to embodiments other than the specific embodiment illustrated in FIG. 5.

Graphical user interfaces typically also permit the user to resize windows. When windows are resized, the title bar is generally resized accordingly. In one embodiment, if a menu icon is located in a title bar of a window that has been resized, the menu icon is relocated so that its position within the resized title bar is proportionate to its previous position in the title bar before the window was resized. The method is similar to the method presented above with respect to switching between application windows of different dimensions except that the "first application window" is the window before resizing. The "second application window" is the application window after resizing. This similarity can be observed by comparing the flowcharts of FIGS. 6 and 7.

Figure 7:
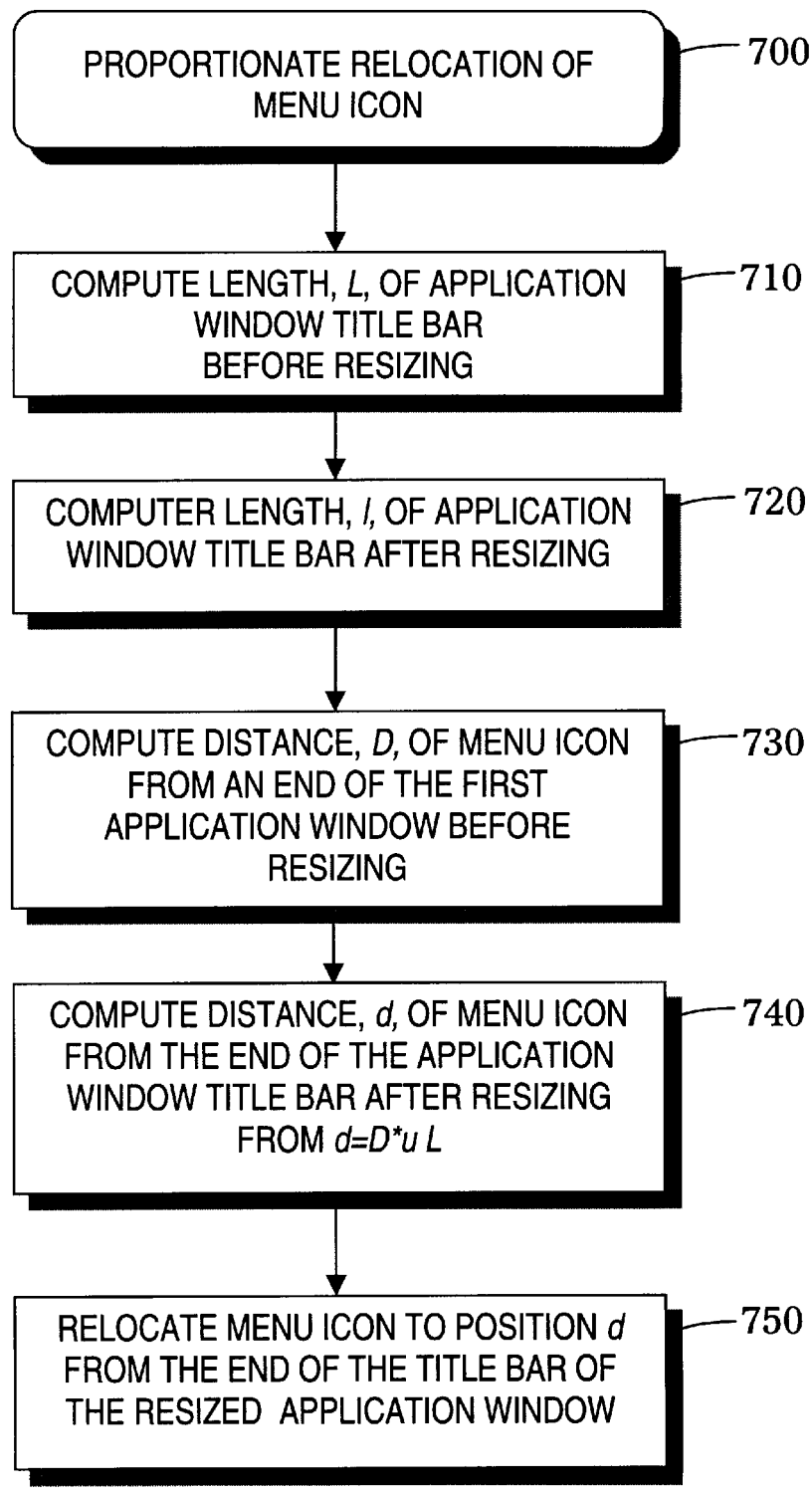
FIG. 7 illustrates a flowchart for relocating the menu icon when the first application window is resized.

FIG. 7 illustrates a flowchart for one embodiment of the method of relocating the menu icon when the first application window is resized (700). A length, L, of the first application window title bar before resizing is determined in step 710. A length, l, of the first application window title bar after resizing is determined in step 720. In step 730, a distance, D, from an end of the first application window title bar before resizing to the menu icon is also needed to compute the distance, d, of the menu icon from the end of the first application window title bar after resizing. In step 740, the distance, d, of the menu icon from the end of the first application window title bar after resizing, is computed from d=D*l/L. The menu icon is relocated to the distance, d, from the end of the first application window title bar after resizing in step 750. Thus the position of the menu icon within the title bar can be proportionately maintained as the application window is resized.

In some graphical user interfaces, the height of the title bar may be varied. In one embodiment, the height of the menu icon varies with the height of the title bar. In other words, as the height of the title bar is increased, the height of the menu icon increases accordingly.

Graphical user interfaces also typically permit the user to move windows. Moving a given window or other displayed items, such as other windows, may result in partially obscuring the given window when focus is returned to the given window.

One way in which a window having the focus can be partially obscured involves other windows designated as "always-on-top" windows. Although a window that has the focus will generally appear "in front of" other windows so that it is not obscured by those other windows, a window designated as "always-on-top" will generally appear "in front of" other windows including the window that has the current focus. Thus if the window that has the current focus is relocated to include at least a portion of the same physical area of the display, the always-on-top window may partially obscure the window having the current focus. In one embodiment, a determination is made as to whether the menu icon would be obscured by another displayed item (such as an always-on-top window), and if so, the menu icon is relocated to another position within the title bar of the application window having the current focus.

FIGS. 8 and 9 illustrate relocation of the menu icon when an always-on-top window is encountered. Window 830 is an always-on-top window. Application window 820 currently has the focus. In FIG. 8 the always-on-top window 830 does not obscure any portion of application window 820. FIG. 9 illustrates always-on-top window 930 partially obscuring application window 920 even though application window 920 has the current focus. This may happen due to relative movement of 920 with respect to 930, for example. Before a portion of application window 820 was obscured, menu icon 822 could be moved to any location within title bar 824. Because the location of 822 would result in being obscured in FIG. 9, the menu icon is relocated to a new position as indicated by menu icon 922.

Another way that a window having the focus can be obscured is if the window that has the focus is moved to a location such that the window is no longer fully within the viewing area of the display. In other words, the window is at least partially obscured by a physical limitation of the display as illustrated in FIGS. 10 and 11.

In one embodiment, a determination is made as to whether the menu icon would be located outside the viewing area of the display due to movement. If so, the menu icon is relocated to another position within the title bar of the application window having the current focus such that the menu icon is located within the viewing area of the display. This type of relocation is illustrated in FIGS. 10 and 11.

Figure 10:
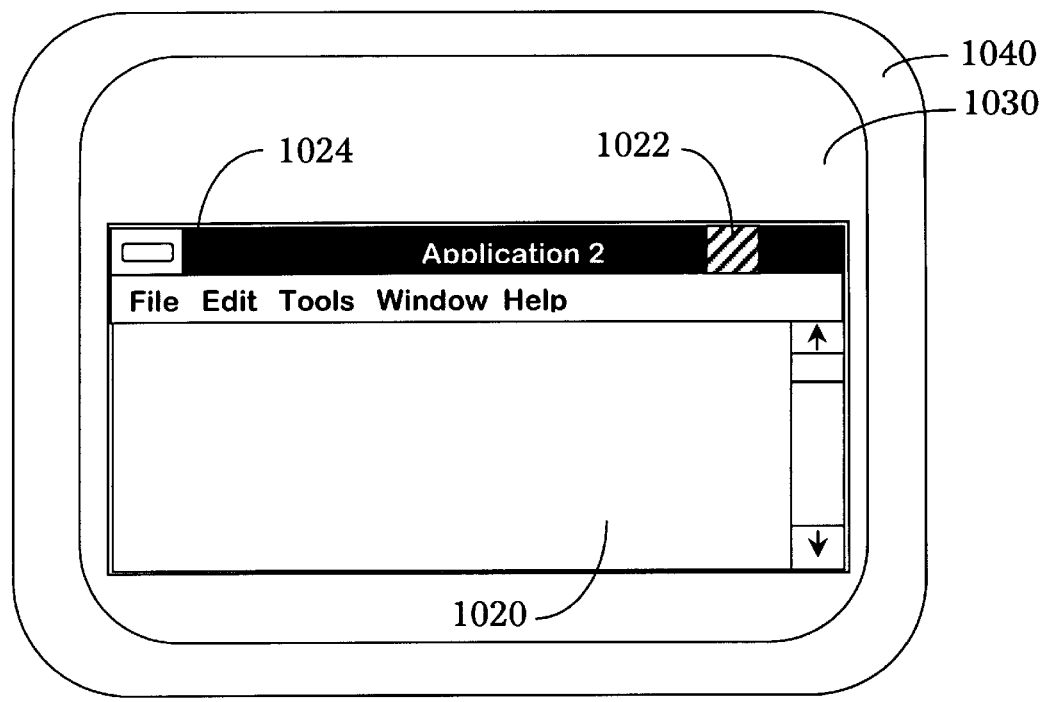
FIG. 10 illustrates an application window before being moved to become partially obscured by the physical limitations of the display device.
Figure 11:
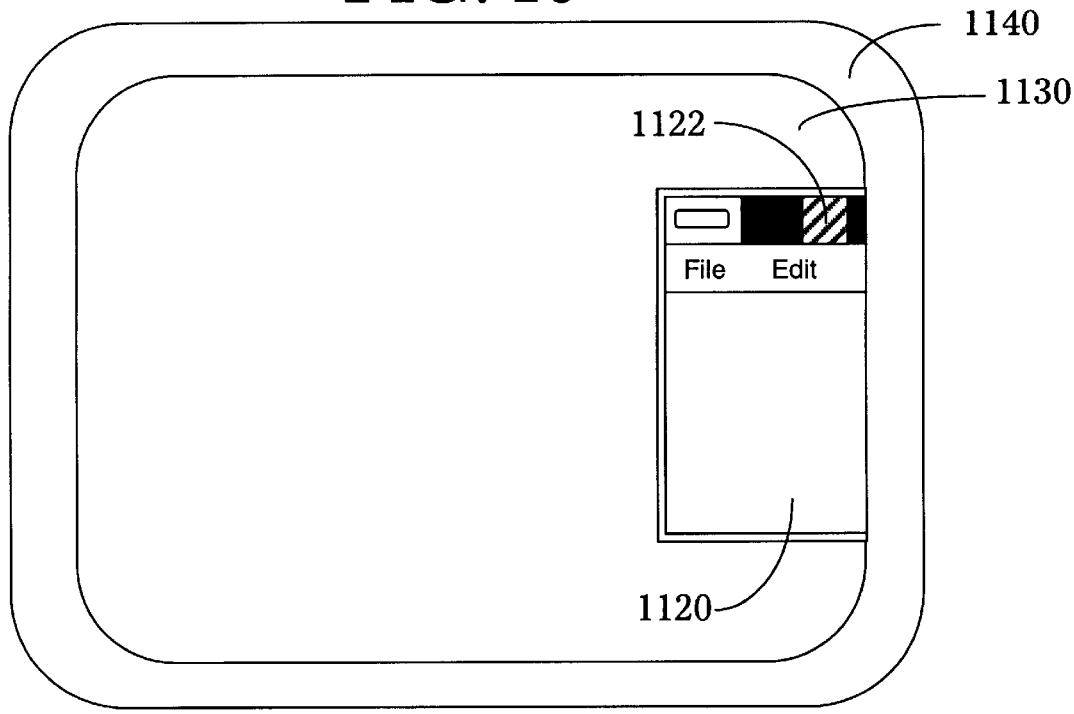
FIG. 11 illustrates relocation of the menu icon when an application window is at least partially obscured by the physical limitations of the display device.

In FIG. 10, application window 1020 is located fully within viewing area 1030 of display device 1040. The application window 1020 is moved so that the application window is partially obscured by the physical limitations of display device 1040 as illustrated in FIG. 11. Referring to FIG. 11, application window 1120 is not fully displayed within the viewing area 1130 of the display device 1140. Referring to FIGS. 10 and 11, instead of maintaining the same relative position of the menu icon before and after the move, menu icon 1022 will be relocated within title bar 1024 if it would not otherwise be located fully within viewing area 1030 after the move. Thus the relative position of menu icon 1022 within title bar 1024 is changed as indicated by the positioning of menu icon 1122. In particular, the menu icon is relocated as indicated by menu icon 1122 so that the menu icon is located fully within the viewing area of the display, if possible.

In one embodiment, the methods presented above are combined to ensure that the menu icon is placed in the title bar of the application window having the current focus so that the menu icon is not obscured. Thus if maintaining proportionality of the location of the menu icon within a title bar would cause the menu icon to become obscured, then the menu icon is relocated to a position within the title bar so that it is not obscured. Similarly, if moving, resizing, or switching the application window that has the focus might cause the menu icon to become obscured, the menu icon is relocated to another position within the title bar of an eligible application window that has the current focus so that the menu icon is no longer obscured. This process is illustrated in FIG. 12 and will be described below.

The steps set forth with respect to the various methods presented above are performed in accordance with instructions provided to a computer. The various embodiments of these methods are implemented by sequences of instructions generically referred to as the "menu icon application." In one embodiment, the menu icon application is a component of the first application. In another embodiment, the menu icon application is a component of an application other than the first application.

Some operating systems which support a graphical user interface, such as MS Windows 95 and MS Windows 3.1, use a messaging system to communicate events to and between applications. Thus specific messages are communicated when windows are moved, resized, selected, etc. In addition, an application can communicate with the operating system to determine the location, size, and other data of other windows. For example, one way to determine whether a menu icon might be obscured is to locate the other graphical objects on the desktop and to compare their "z" order with that of the desired location of the menu icon. Variations in "z" order indicate whether objects will appear in front of or behind other objects (i.e., obscured). If another graphical object or window has sufficient proximity to the location being examined and the relative "z" order indicates that the window having the current focus should appear behind the other graphical object or window, then a determination is made that the menu icon would be obscured. The menu icon itself should have sufficient "z" to ensure that it is always "on top of" its associated eligible window.

In some operating systems, an application can "hook" into the operating system so that it is notified of specific messages. Thus the menu icon application might identify triggering events as messages corresponding to an event that could result in obscuring the menu icon. In one embodiment, messages corresponding to focus changes, window creation, and window or graphical object movement are considered to be triggering events.

FIG. 12 illustrates a flowchart for one embodiment of the function of relocating the menu icon 1200 in response to a triggering event 1210. Triggering events that might result in the menu icon becoming obscured include changing the focus to an eligible window 1212 and moving a window or other graphical object 1214.

In response to a triggering event 1210, the menu icon application determines whether the menu icon is or would be obscured by another graphical object in step 1220. If so, then a determination is made as to whether the menu icon can be moved to a non-obscured location 1240. If the menu icon can be relocated, then it is relocated in step 1250 and the process ends at step 1270. If the menu icon cannot be relocated, then another choice must be made. In one embodiment, the menu icon is not displayed. In another embodiment, the menu icon is relocated to the desktop as illustrated in step 1260.

If the menu icon is not obscured by another graphical object as determined in step 1220, then a determination is made as to whether the menu icon is or would be within the viewing area of the display device in step 1230.

If the menu icon might be obscured by the physical limitations of the display device, then the process of relocating the menu icon proceeds to step 1240 as described above. If however, the menu icon is not obscured by other graphical objects nor the physical limitations of the display device, then the menu icon does not need to be moved in this embodiment and the relocation process terminates at step 1270.

In another embodiment, the menu icon application examines the desktop to determine if the menu icon has or will become obscured. The system clock might be used to periodically initiate the examination process. Thus the triggering event might be the system clock rather than an indication of movement. The examination process compares the "z" order and the size and location of other windows on the desktop with similar parameters of the window having the current focus to determine if the menu icon should be relocated as set forth above.

Although the embodiments presented above have used the title bar for the location of the menu icon, the menu icon may be placed in other areas of the application window such as the menu bar or the area of the application window generally used for displaying the subject matter. Due to the relatively static nature of the title bar in contrast to the typically dynamic nature of menu bars or the subject matter of the application window, the menu icon tends to require less frequent relocation if placed within the title bar.

In one embodiment, the menu icon application instructions are executed by the same computer that the first application is executing on. In some operating systems, however, applications may execute on a different computer than the computer responsible for managing the windows and other graphical objects the display. This is possible, for example, with the X Window System.

The X Window System was developed at the Massachusetts Institute of Technology. The X Window System uses a standardized set of display-handling routines with the goal of creating hardware independent graphical user interfaces. The X Window System is often associated with UNIX-based operating systems. The two basic components of an X Window System are the X Server and the X Client.

An X Server is an X Window System graphics application that controls a computer display device. The X Server draws windows, text, lines, circles, polygons, etc. according to requests from an X Client. An X Client is an X Window System application program that communicates with the X Server using a messaging system that adheres to the X protocol. Using X protocol messages, the X Client instructs the server to produce graphical output on the computer display device. The X Server might handle multiple X Clients.

Because the X Client communicates with the X Server through messages, the messages might be sent over a network to an X Server executing on a different machine (i.e., a distributed system). Consider an example where the X Client is executing on one machine (Machine A) and the X Server is executing on another machine (Machine B). The X Client application executing on Machine A is displayed on the display device of Machine B using the X Server executing on Machine B. The menu icon application relocation instructions could be implemented as part of the X Client or the X Server. Thus, in one embodiment, the menu icon application relocation instructions are executed by a computer (Machine B) other than the computer that the first application is executing on (Machine A).

In various embodiments, the instructions associated with the menu icon application might reside in one module or the instructions may be divided among a number of modules. For example, the instructions for determining whether a triggering event has taken place may reside in a dynamically linked library and the instructions indicating the steps to perform upon the occurrence of a triggering event may reside in another module.

Various operations have been described above as discrete steps in a manner that is helpful in describing computer-implemented processes. The order of description, however, should not be construed to imply that these operations are necessarily order dependent. In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of providing access to a first application in a graphical user interface, comprising the steps of:
   a) determining if a first window is associated with the first application, wherein the first window has a current focus;
   b) placing a menu icon within a distance D of an end of a title bar of the first window, if the first application is not associated with the first window; and
   c) providing a menu associated with the first application if the menu icon is selected.

2. The method of claim 1 further comprising the step of:
   d) disassociating the menu icon from a second window previously having the focus.

3. The method of claim 1 further comprising the step of:
   d) moving the menu icon, if the menu icon would otherwise be obstructed.

4. The method of claim 1 further comprising the step of:
   d) identifying a menu item and the first window to the first application, if the menu item is selected from the menu.

5. The method of claim 1 wherein the menu icon is located within the first window.

6. The method of claim 1 wherein the menu icon is located outside the first window.

7. A method of repositioning a menu icon located within a distance D of an end of a title bar of a first window, the menu icon capable of providing a menu associated with a first application, the first application not associated with the first window, comprising the steps of:
   a) determining if a second window will obscure at least a portion of the first window;
   b) determining if the second window is within a distance, l, of the menu icon; and
   c) repositioning the menu icon to a new location within the first window, wherein the menu icon is not within a distance, l, of the second window.

8. The method of claim 7 further comprising the step of:
   d) identifying a menu item and the first window to the first application, if the menu item is selected from the menu.

9. The method of claim 7 wherein the menu icon is originally located within the first window.

10. The method of claim 7 wherein the menu icon is not originally located within the first window.

11. A method of repositioning a menu icon located within a distance D of an end of a title bar of a first window, the menu icon capable of providing a menu associated with a first application, the first application not associated with the first window, comprising the steps of:
    a) determining if an edge of a display device is within a distance, l, of the menu icon, wherein at least a portion of the first window is displayed on the display device; and
    b) repositioning the menu icon to a new location within the first window, wherein the menu icon is not within the distance, l, of the edge of the display device, wherein the new location is within a viewing area of the display device.

12. The method of claim 11 wherein the first application is a video conferencing application.

13. The method of claim 11 further comprising the step of:
    c) identifying a menu item and the first window to the first application, if the menu item is selected from the menu.

14. A method of relocating a menu icon in a graphical user interface, comprising the steps of:
    a) determining if a triggering event has occurred;
    b) determining if the menu icon is obscured by another graphical object, the menu icon capable of providing a menu associated with a first application, wherein the menu icon is located within a distance D of an end of a title bar of a first window of a second application;
    c) determining if the menu icon can be relocated to a first area within a viewing area of a display device.

15. The method of claim 14 further comprising the step of:
    d) relocating the menu icon to the first area.

16. The method of claim 14 wherein the first area is the title bar of the first window.

17. The method of claim 14 wherein the first application is a video conferencing application.

18. The method of claim 14 further comprising the step of:
    d) identifying a menu item and the first window to the first application, if the menu item is selected from the menu.

19. The method of claim 14 further comprising the step of:
    d) relocating the menu icon to a second area, if the menu icon cannot be relocated to the first area.

20. The method of claim 19 wherein the second area is the desktop.

21. The method of claim 14 wherein a triggering event includes at least one of a change of focus, a movement of another graphical object, a creation of another window, or a clock signal indicating that a period of time has elapsed.

22. The method of claim 14 wherein the menu icon is located within the first window in step b).

23. The method of claim 14 wherein the menu icon is not located within the first window in step b).

* * * * *